(No Model.)

R. H. WILES & H. BITNER.
KETTLE.

No. 545,434. Patented Aug. 27, 1895.

Witnesses:
Charles Shervey
A. H. Ebbesen

Inventors
Robert H. Wiles
and Harry Bitner
by Wiles and Bitner

UNITED STATES PATENT OFFICE.

ROBERT H. WILES, OF FREEPORT, AND HARRY BITNER, OF CHICAGO, ILLINOIS.

KETTLE.

SPECIFICATION forming part of Letters Patent No. 545,434, dated August 27, 1895.

Application filed January 2, 1895. Serial No. 533,553. (No model.)

*To all whom it may concern:*

Be it known that we, ROBERT H. WILES, residing at Freeport, in the county of Stephenson, and HARRY BITNER, residing at Chicago, in the county of Cook, State of Illinois, citizens of the United States, have invented certain new and useful Improvements in Kettles, of which the following is a specification.

Our invention relates to certain improvements designed for application to the ordinary kettle having a pivoted bail for a handle.

The object of the improvement is to enable the kettle to be tipped or tilted with one hand sufficiently to pour out the contents thereof or to allow the same to be easily scraped out with a spoon held in the other hand.

To this end the invention consists in a certain new and improved construction, the essential features of which consist in the combination, with a kettle, of a pivoted bail, so formed as to be non-rotatable in the hand, and a stop properly located to prevent the swinging of the bail beyond a certain predetermined limit, preferably about at right angles to the plane of the top of the kettle.

The invention is illustrated by means of six figures, of which—

Figure 1:
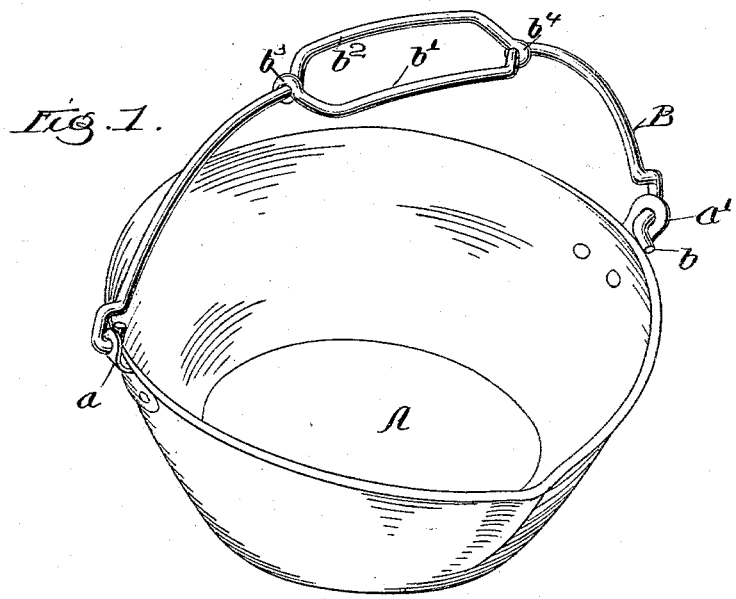
Figure 2:
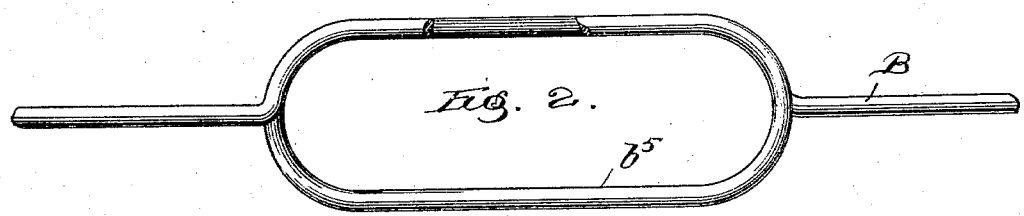
Figures 3, 4, 5, 6:
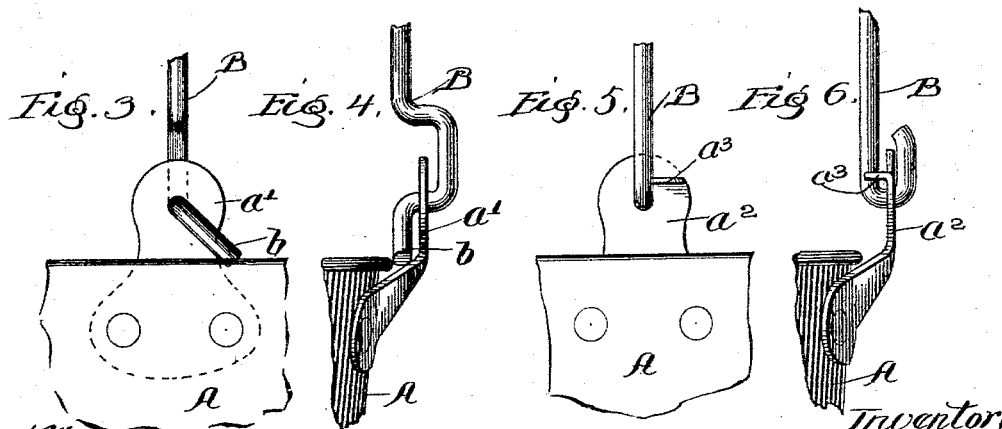

Figure 1 is a perspective of a kettle, showing one of the forms of our invention. Fig. 2 is a plan of a modified bail. Fig. 3 is a side elevation, upon a larger scale, of one end of the bail and the portion of the kettle about the adjacent ear. Fig. 4 is a similar elevation at right angles to the first. Fig. 5 is a view similar to Fig. 3 of a modification, and Fig. 6 is a view similar to Fig. 4 of the said modification.

The kettle is lettered A and the bail B. In Figs. 1, 3, and 4 the kettle is shown as provided with ordinary ears $a$ $a'$, in which the bail is pivoted. The latter is secured to the ear $a$ in the ordinary manner; but the portion extending through the ear $a'$ has a downward extension $b$, adapted to engage with the ear to prevent the forward movement of the bail beyond the position shown. The central portion of the bail B is widened or extended laterally to furnish a non-rotatable handle to be grasped in the hand in tilting the kettle. The widening of the bail to form the handle may be accomplished in a great variety of ways, of which two are shown as illustrations. In Fig. 1 the bail is made of two pieces of wire $b'$ $b^2$, joined together at $b^3$ $b^4$. In Fig. 2 the wire is folded back upon itself to form a loop $b^5$.

Figs. 5 and 6 show the application of the bail-stop to the ears of the kettle. The ear $a^2$ has an inturned portion $a^3$, against which the bail strikes when it reaches the desired position.

In use the bail is free to fall backward out of the way when the same is desirable. When the kettle is lifted, however, and tipped forward, the stop makes the bail rigid with the kettle and enables the latter to be held in one hand to pour off the contents or otherwise empty the same.

We are aware that it is common to make handles for kettles or similar articles of such shape that they do not easily rotate or turn in the hand, and we are also aware that it is common to make kettles with round-wire bails and stops to prevent them from passing a vertical position in one direction; but we believe that a bail having a non-rotatable handle has never been used in combination with such a stop, and we therefore desire not to limit ourselves to any specific form of handle or to any particular form or location of stop; but

We claim as new and desire to secure by Letters Patent—

1. The combination with a kettle of a bail hinged thereto and free to swing in one direction only from a position substantially at right angles to the top of the kettle, the bail being provided with an approximately central handle, adapted by its rotation to rotate the bail, and having a lateral extent affording leverage for such rotation.

2. The combination with a kettle, of a wire bail hinged thereto and free to swing in one direction only from a position substantially at right angles to the top of the kettle, the bail being formed with an approximately central integral skeleton handle having a width affording leverage for rotating the bail.

3. The combination with a kettle, of a bail formed of two pieces of wire having their outer ends hinged to the kettle, their inner ends being oppositely off-set and connected to form an open skeleton handle; substantially as shown and described.

ROBERT H. WILES.
HARRY BITNER.

Witnesses:
CHAS. O. SHERVEY,
A. I. H. EBBESEN.